United States Patent
Schmitz et al.

(10) Patent No.: US 6,537,339 B2
(45) Date of Patent: Mar. 25, 2003

(54) MOISTURE DRAINING INSIDE-OUT REVERSE FLOW AIR FILTER, MOLD AND METHOD

(75) Inventors: Kelly R. Schmitz, Stoughton, WI (US); Kent J. Kallsen, Oregon, WI (US); Jon S. Wake, Verona, WI (US)

(73) Assignee: Nelson Industries, Inc., Stoughton, WI (US)

( * ) Notice: Subject to any disclaimer, the term of this patent is extended or adjusted under 35 U.S.C. 154(b) by 0 days.

(21) Appl. No.: 09/849,204

(22) Filed: May 4, 2001

(65) Prior Publication Data

US 2002/0162309 A1 Nov. 7, 2002

(51) Int. Cl.⁷ ............................................... B01D 46/00
(52) U.S. Cl. .............................. 55/498; 55/428; 55/502; 96/189; 210/493.1; 210/493.2; 210/493.5
(58) Field of Search ...................... 55/392, 396, 423, 55/424, 498, 502, 510, 428; 96/189; 210/493.1, 493.2, 493.5

(56) References Cited

U.S. PATENT DOCUMENTS

| | | | |
|---|---|---|---|
| 2,387,278 A | * 10/1945 | Lowther | 96/338 |
| 3,508,383 A | * 4/1970 | Humbert, Jr. et al. | 55/337 |
| 4,116,647 A | * 9/1978 | Garner | 96/275 |
| 4,235,609 A | * 11/1980 | Garigioli | 55/498 |
| 4,322,230 A | * 3/1982 | Schoen et al. | 55/498 |
| 4,735,640 A | 4/1988 | Thornburgh et al. | |
| 4,818,261 A | * 4/1989 | Beckon | 55/498 |
| 5,591,338 A | * 1/1997 | Pruette et al. | 210/493.1 |
| 5,613,992 A | 3/1997 | Engel | |
| 5,690,712 A | 11/1997 | Engel | |
| 5,897,676 A | 4/1999 | Engel et al. | |
| 5,938,804 A | 8/1999 | Engel | |

FOREIGN PATENT DOCUMENTS

RU  1000-074 A  10/1981

* cited by examiner

Primary Examiner—David A. Simmons
Assistant Examiner—Minh-Chau T. Pham
(74) Attorney, Agent, or Firm—Andrus Sceales, Starke & Sawall, LLP

(57) ABSTRACT

An inside-out reverse flow air filter element (20) has a resiliendtly compressible molded lower end cap (48) having molded drainage surfaces including a molded raised central dome (72) shedding moisture radially outwardly and downwardly, a plurality of molded drainage holes (70, 74, 76, 78) spaced radially outwardly of and below the top of the central dome, and a plurality of radial segments (98, 100, 102, 104, 110, 112, 114, 116), an annular trough (80) and tapered slope surfaces (82, 84) providing desired drainage. A mold (130) has a plurality of upstanding segments (136, 138, 140, 142) having posts (144) and ramps (146) forming the drainage structure, and locator faces (152) engaging, guiding and locating the annular filter media (34) in the mold.

14 Claims, 8 Drawing Sheets

MOISTURE DRAINING INSIDE-OUT REVERSE FLOW AIR FILTER, MOLD AND METHOD

BACKGROUND AND SUMMARY

The invention relates to air filters, and more particularly to inside-out reverse flow air filters, and further particularly to moisture drainage from such filters.

Inside-out reverse flow air filter elements are known in the prior art, and include annular filter media having a hollow interior and extending axially along a central vertical axis, an upper annular end cap having a central opening for receiving incoming air flow axially downwardly into the hollow interior, and a closed lower end cap spanning the hollow interior, such that air in the hollow interior flows radially outwardly through the annular filter media. These types of filter elements are used in various air cleaner housing designs wherein better packaging is facilitated if the air flows from inside to outside, sometimes called reverse flow. In such implementations, there is a need to remove moisture that may accumulate in the noted interior of the filter element. The present invention addresses and solves this need, particularly in cost-driven evolving designs replacing metal end caps with resilient compressible molded end caps such as foamed urethane.

The invention provides improved drainage structure, molding, and methodology.

DETAILED DESCRIPTION

Figure 1:
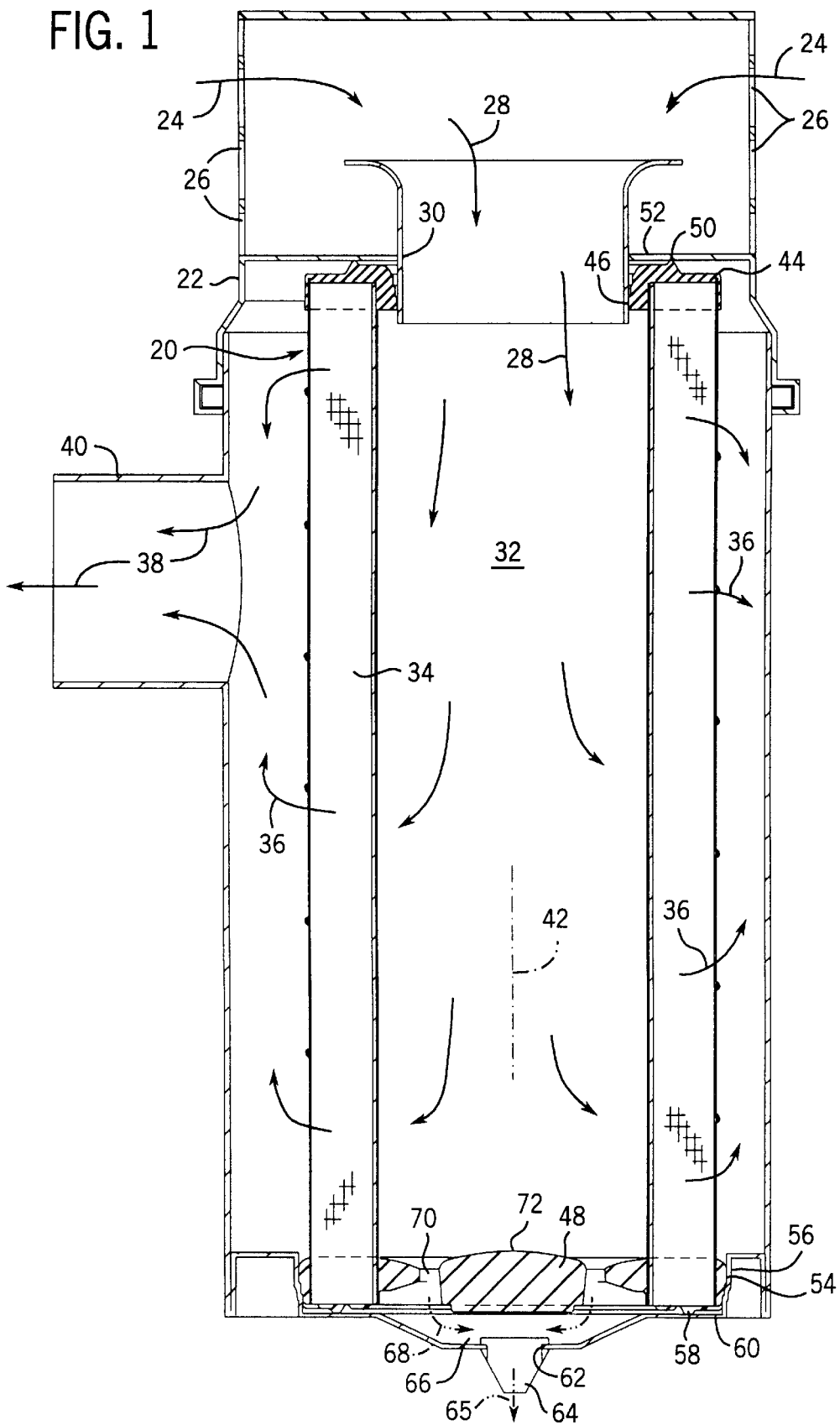
FIG. 1 is a side sectional view showing an inside-out reverse flow air filter in accordance with the invention.

FIG. 1 shows an inside-out reverse flow air filter element 20 in a filter housing 22. Air flows into the housing as shown at arrows 24 through a plurality of apertures 26 spaced around cylindrical filter housing 22, and then flows as shown at arrow 28 through inlet tube 30 into hollow interior 32 of annular filter media 34, and then flows radially outwardly as shown at arrows 36 through filter media 34 and then as shown at arrows 38 through housing outlet 40. Annular filter media 34 has the noted hollow interior 32 extending axially along a central vertical axis 42. The filter element includes an annular upper end cap 44 having a central opening 46 receiving inlet tube 30 and receiving incoming air flow at arrow 28 axially downwardly into hollow interior 32. The filter element includes a closed lower end cap 48 spanning hollow interior 32, such that air in hollow interior 32 flows radially outwardly as shown at arrows 36 through annular filter media 34. Each of end caps 44 and 46 is a resiliently compressible molded member, for example foamed urethane. Upper end cap 44 is radially sealed at 46 by being compressed inlet tube 30, and is axially sealed at 50 by being compressed against housing wall 52. Lower end cap 48 is radially sealed at 54 along its outer surface against housing end plate portion 56, and is axially sealed at 58 against housing end plate surface 60. End plate 60 includes a central aperture 62 receiving an axially moveable end plug 64 which may be axially depressed upwardly to discharge water as shown at arrow 65 or other moisture collected in lower housing reservoir 66 which has drained as shown at arrows 68 through drainage holes such as 70 in lower end cap 48 from interior 32 of the filter element.

Figure 2:
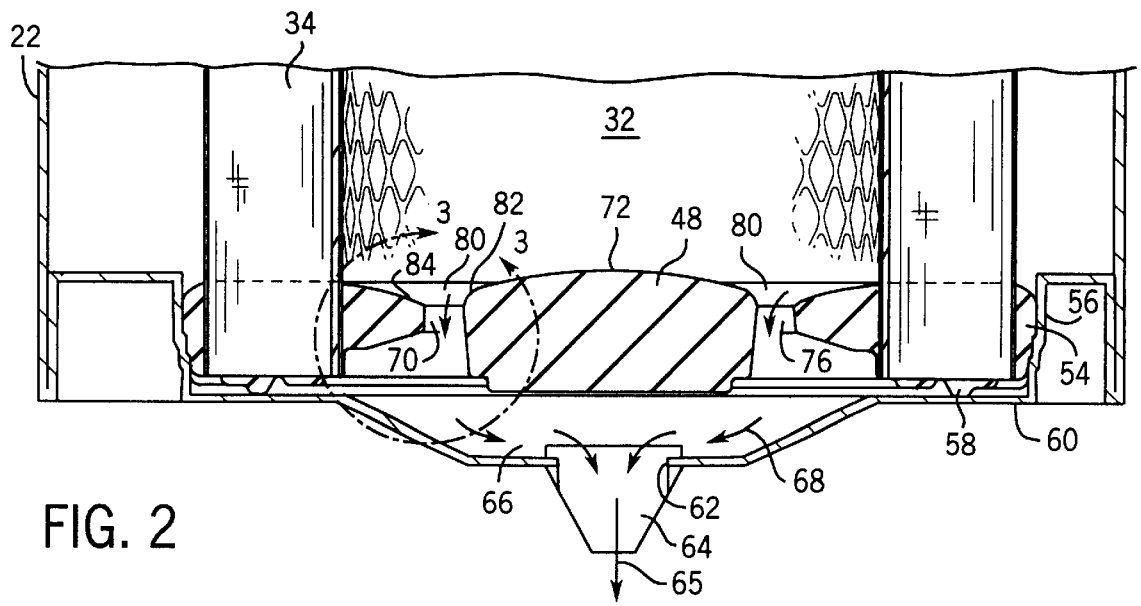
FIG. 2 is an enlarged view of a portion of FIG. 1.

Lower end cap 48 has molded drainage surfaces, FIG. 2, including a molded raised central dome 72 shedding moisture radially outwardly and downwardly from central axis 42, and a plurality of molded drainage holes 70, 74, 76, 78, FIGS. 2, 9, spaced radially outwardly of central axis 42 and below the top of central dome 72. Drainage holes 70, 74, 76, 78 circumscribe central dome 72. The molded drainage surfaces further include an annular trough 80, FIGS. 2, 3, 9, 11, 12, having a first surface 82 sloped upwardly and radially inwardly toward central dome 72, and having a second surface 84 sloped upwardly and radially outwardly toward annular filter media 34. Trough 80 is radially spaced between central dome 72 and annular filter media 34. Drainage holes 70, 74, 76, 78 are in trough 80.

Figure 3:
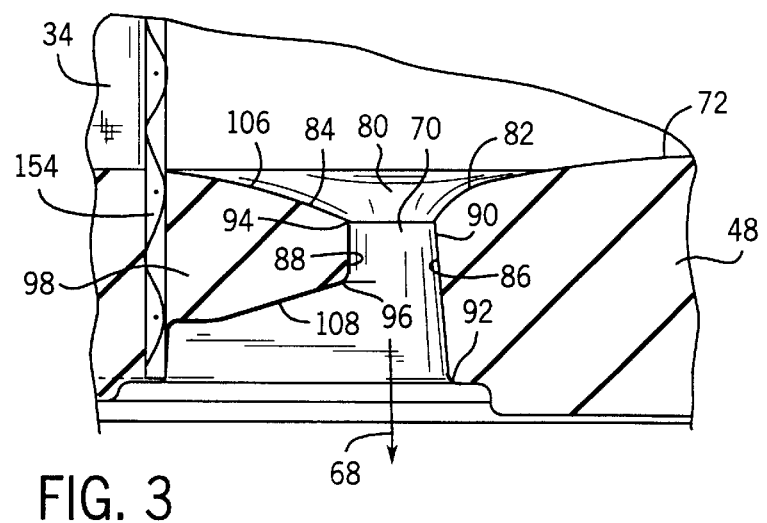
FIG. 3 is an enlarged view taken along line 3—3 of FIG. 2.
Figure 4:
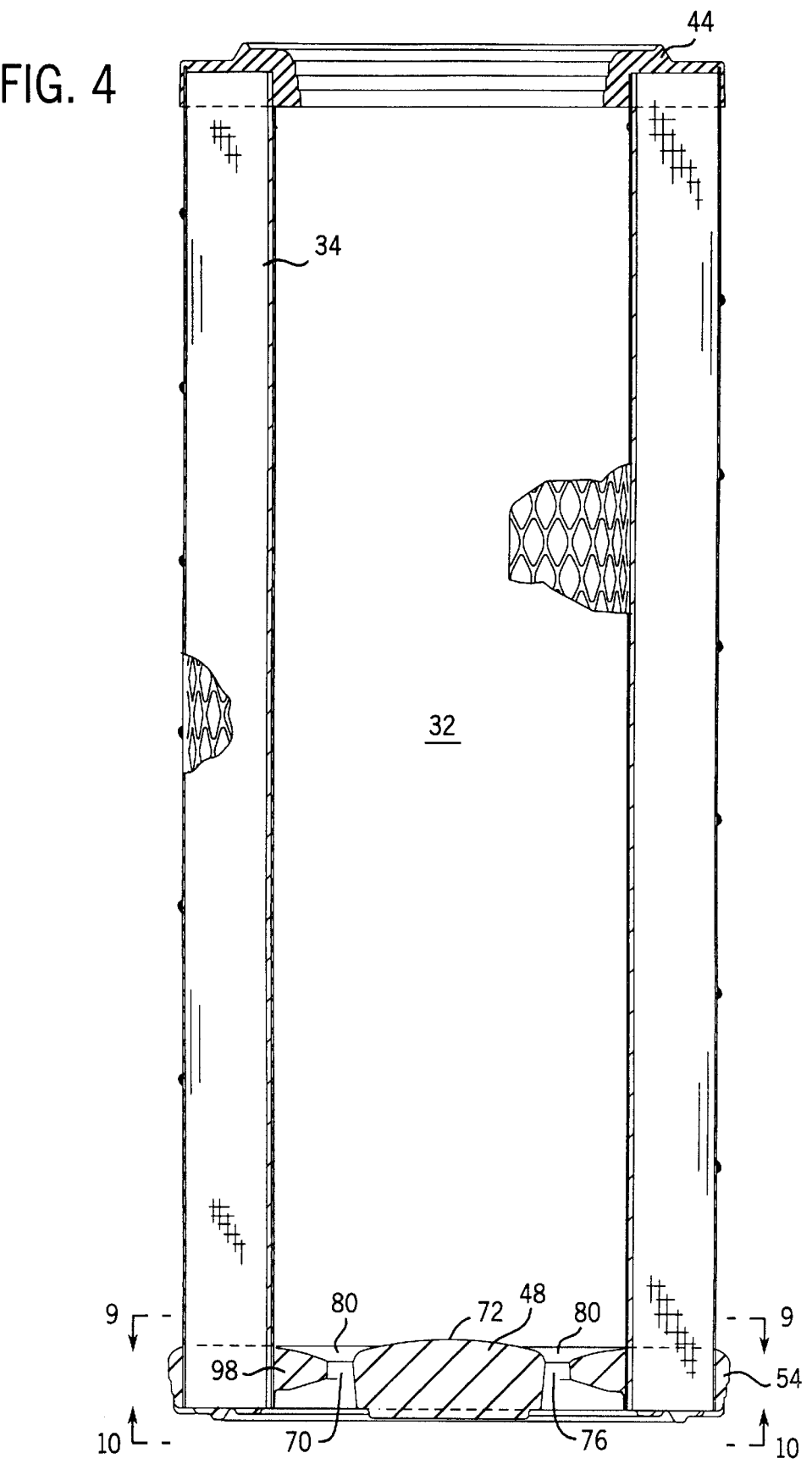
FIG. 4 is a sectional view showing the filter element of FIG. 1.

Each drainage hole 70, 74, 76, 78 extends axially through lower end cap 48 and has axially extending side walls of different axial length, FIG. 3, including an inner sidewall 86 having a first vertical axial length and receiving moisture from central dome 72, and an outer sidewall 88 having a second vertical axial length and spaced radially outwardly of inner sidewall 86 by drainage hole 70 therebetween and spaced radially inwardly of annular filter media 34 and receiving moisture therefrom. The axial length of sidewall 86 is greater than the axial length of sidewall 88. Sidewall 86 extends from an upper reach 90 downwardly to a lower reach 92. Sidewall 88 extends from an upper reach 94 downwardly to a lower reach 96. The lower reach 92 of inner sidewall 86 is below the lower reach 96 of outer sidewall 88.

Figure 9:
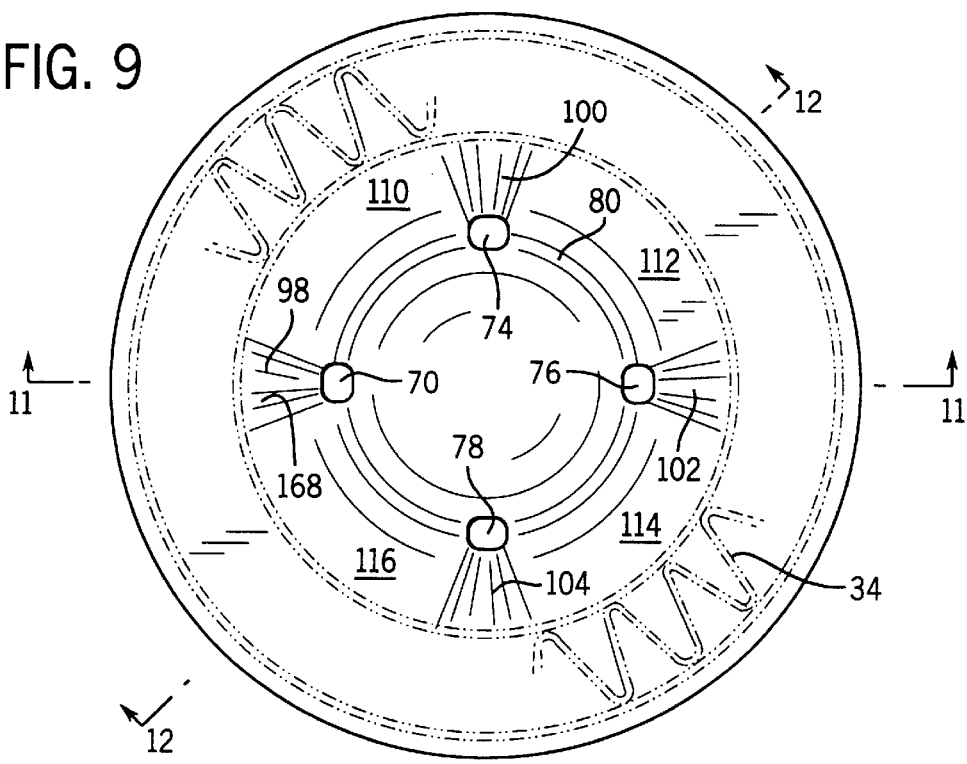
FIG. 9 is a sectional view taken along line 9—9 of FIG. 4.
Figure 10:
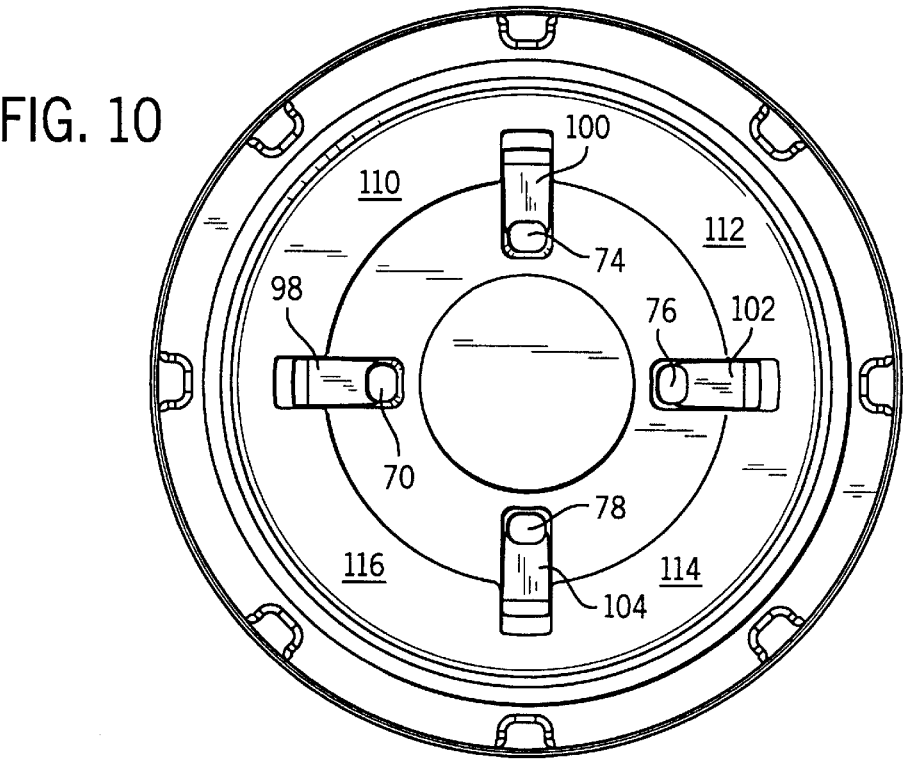
FIG. 10 is a bottom elevation view taken along line 10—10 of FIG. 4.
Figure 11:
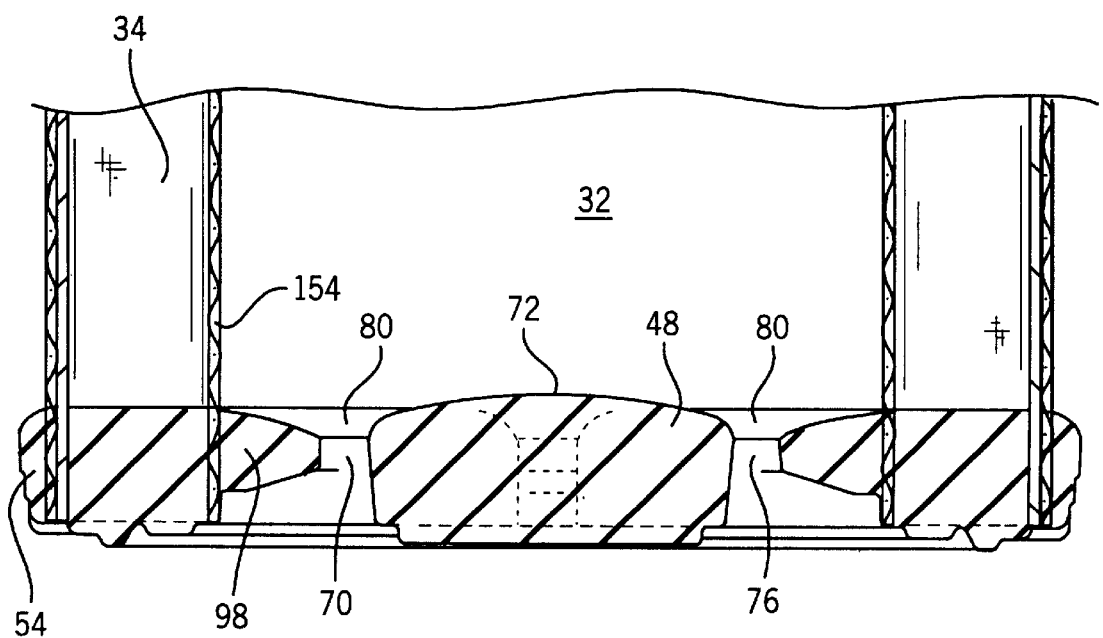
FIG. 11 is a sectional view taken along line 11—11 of FIG. 9.
Figure 12:
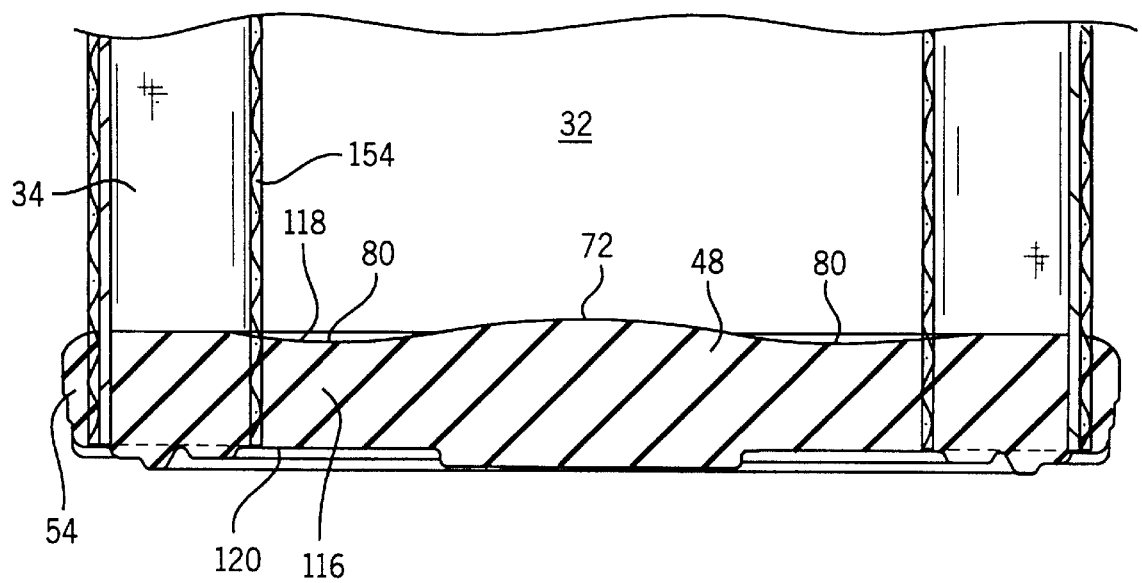
FIG. 12 is a sectional view taken along line 12—12 of FIG. 9.

Lower end cap 48 has a set of plurality of radial segments 98, 100, 102, 104, FIGS. 3, 9, 10, one for each drainage hole. Each radial segment extends from a respective drainage hole radially outwardly toward annular filter media 34. Lower end cap 48 has top and bottom surfaces 106 and 108, respectively, FIG. 3, along each of the radial segments. Top surface 106 tapers upwardly as it extends radially outwardly from drainage hole 70. Bottom surface 108 tapers downwardly as it extends radially outwardly from drainage hole 70. The vertical axial thickness of lower end cap 48 varies along the noted radial segments, with such axial thickness increasing as such segment extends radially outwardly. Lower end cap 48 has a second set of a plurality of radial segments 110, 112, 114, 116, FIGS. 9, 10, 12, interdigitated with the noted first mentioned set of radial segments 98, 100, 102, 104. The first and second sets of radial segments circumscribe central dome 72. Lower end cap 48 has top and bottom surfaces 118 and 120, respectively, FIG. 12, along each of the radial segments 110, 112, 114, 116 of the noted second set. The top surface tapers upwardly as it extends radially outwardly from trough 80. Top surfaces 118 of the radial segments 110, 112, 114, 116 of the second set taper at a smaller angle relative to horizontal than top surfaces of radial segments 98, 100, 102, 104 of the first set. Bottom surface 120 extends substantially horizontally as it extends radially outwardly. Lower end cap 48 has an axial thickness which varies along each of the radial segments 110, 112, 114, 116 as they extend radially outwardly, namely such axial thickness increases as the segment extends radially outwardly. The variance of axial thickness of lower end cap 48 along the first set of radial segments 98, 100, 102, 104 is greater than the variance of axial thickness of lower end cap 78 along the second set of radial segments 110, 112, 114, 116.

Figure 5:
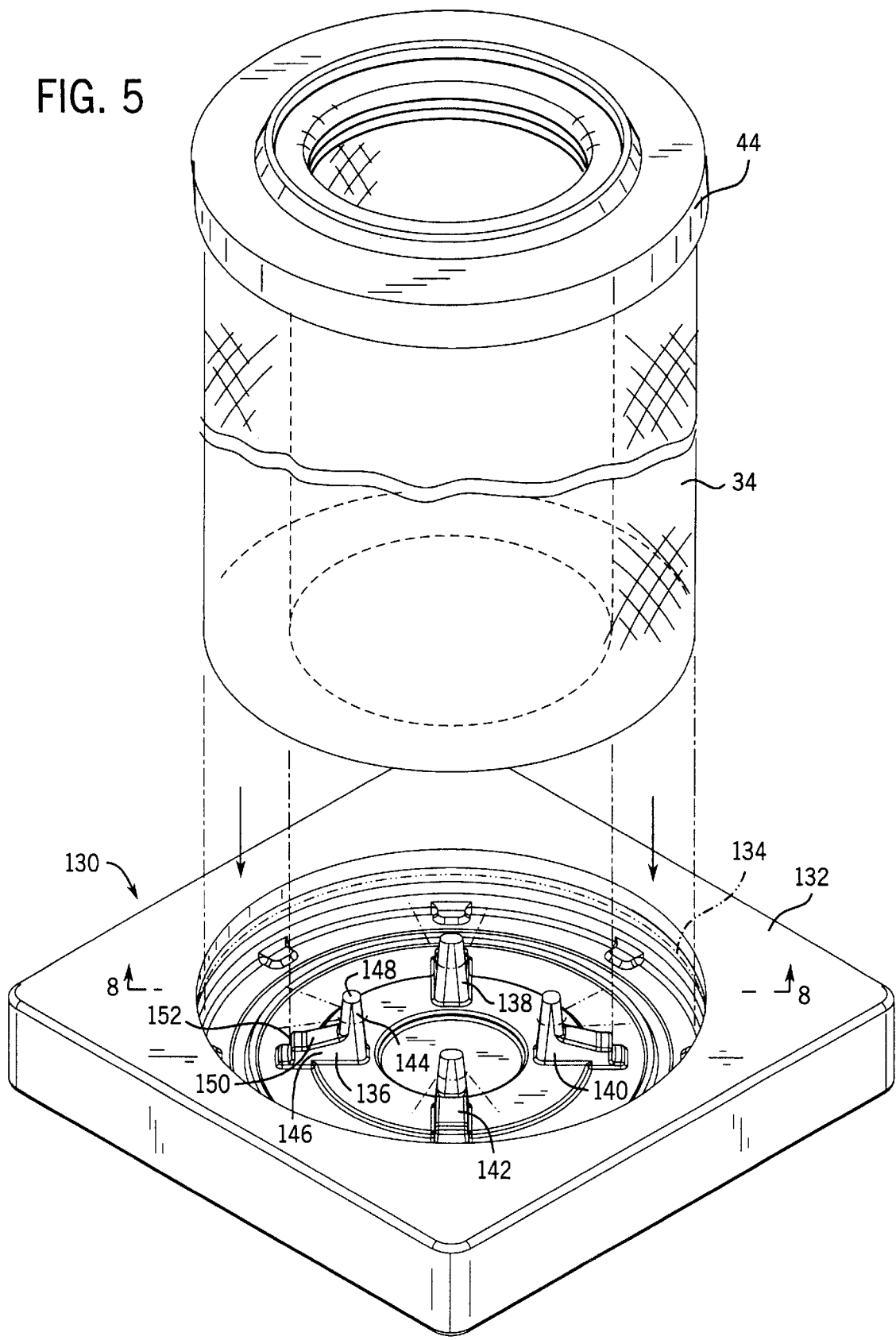
FIG. 5 is an exploded perspective view showing a mold and filter element.
Figure 6:
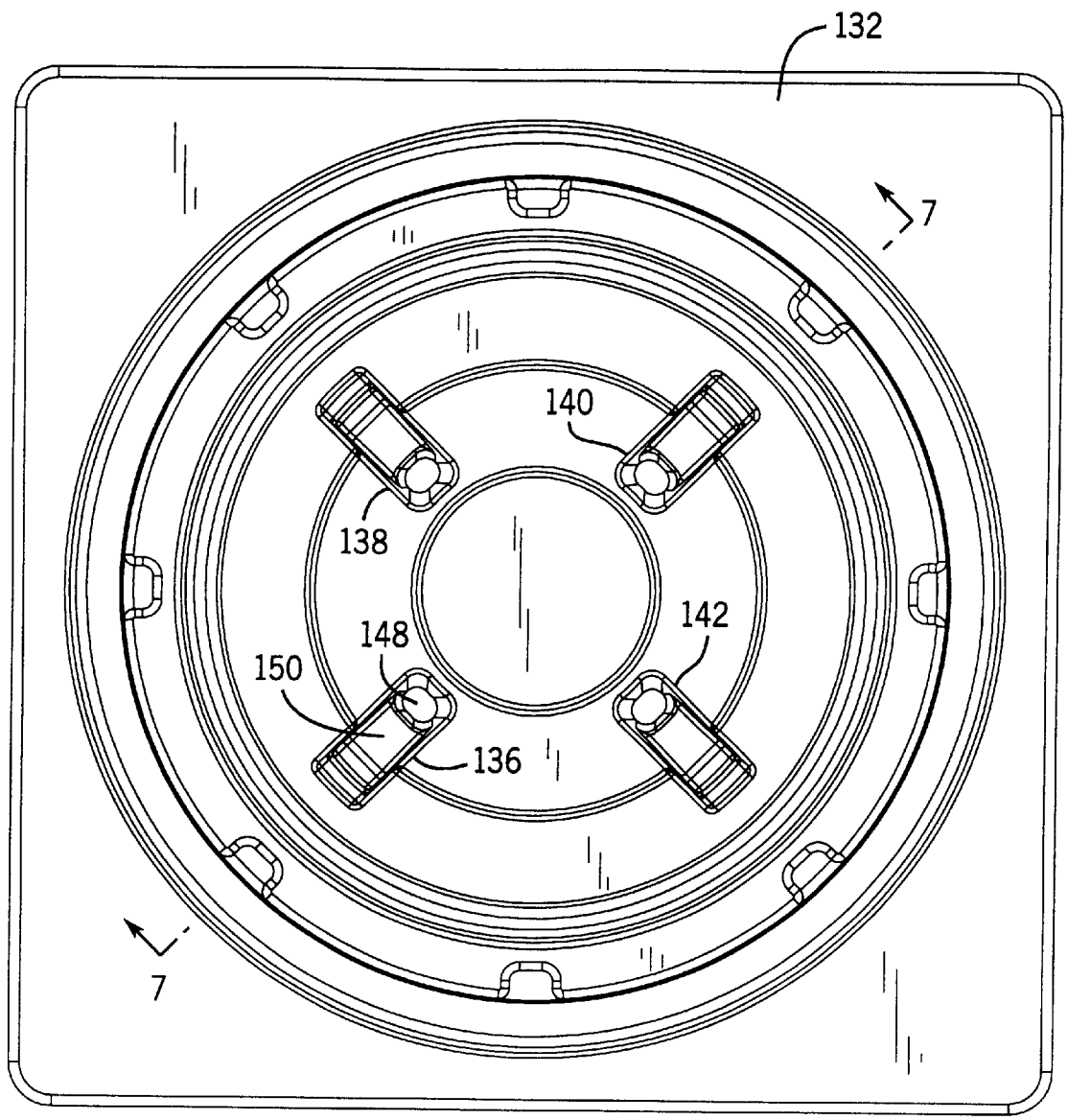
FIG. 6 is a top plan view of the mold of FIG. 5.

FIG. 5 shows the mold 130 for making lower end cap 48. The mold includes a base 132 having a well 134 holding liquefied molding material, preferably urethane foam potting compound, such as Nelson Industries, Inc. Part No. Q50419. Annular filter media 34 is dipped into the liquefied molding material, and the latter is allowed to set, as is known, to a resiliently compressible molded state providing the lower end cap. Upper end cap 44 is molded to annular filter media 34 in like manner, before or after molding of the lower end cap.

Figure 7:
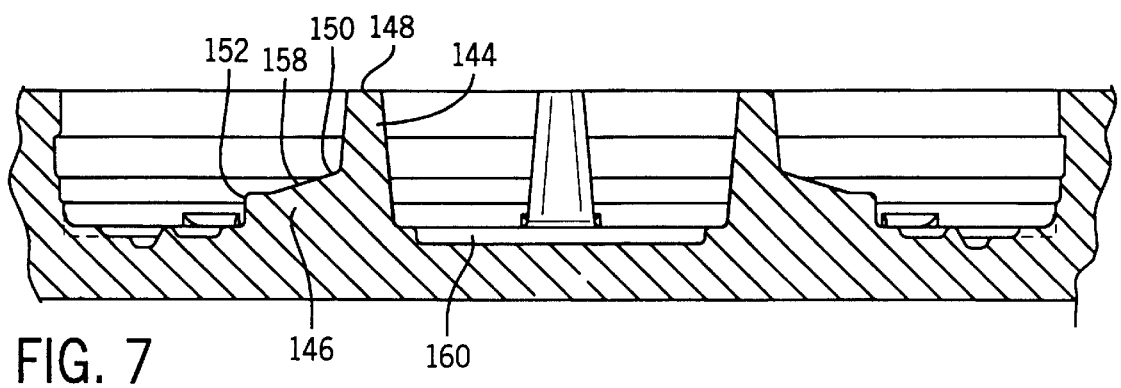
FIG. 7 is a sectional view taken along line 7—7 of FIG. 6.

Mold 130 has a plurality of upstanding segments 136, 138, 140, 142. Each segment has a post 144, FIGS. 5, 7, 8, and a ramp 146. Post 144 extends upwardly through the liquefied molding material to an upper reach 148 above the surface of the liquefied molding material, to provide respective drainage hole 70 in lower end cap 48. The diameter of post 144 is selected such that the drainage hole will be diametrically sized such that a droplet of water or other moisture can escape, but small enough that contaminate is not likely to escape the enclosure created by the end cap. Ramp 146 extends radially outwardly from post 144, and extends upwardly in the liquefied molding material to an upper reach 150 below the surface of the liquefied molding material. Each ramp has an outer locator face 152 below the surface of the liquefied molding material and facing radially outwardly to engage, guide and locate annular filter media 34 in the mold, preferably by engaging inner liner 154, FIG. 8, sliding downwardly therealong until stopped against lower surface 156. Ramp 146 has a top surface 158 which tapers downwardly as it extends radially outwardly from post 144.

As above noted, the liquefied molding material is preferably urethane foam. As known, urethane foam exhibits some expansion as it sets from liquefied form. This is used to advantage in the present system. Mold 130 has a middle region 160, FIGS. 5, 7, 8 between the posts of the noted segments 136, 138, 140, 142. Middle region 160 has differing vertical depth portions including a central first portion 162, FIG. 8 of a first vertical depth and a surrounding second portion 164 of a second vertical depth. The vertical depth of first portion 162 is greater than the vertical depth of second portion 164 such that there is more urethane foam and hence greater expansion in first portion 162 than in second portion 164. This central bulging provides central upwardly facing dome 72 in lower end cap 48 which sheds moisture radially outwardly and downwardly from central axis 42. The greater amount of material in the central portion provides the greater expansion upwardly to provide the noted central dome. A generally convex curvature has been observed, and it is believed that surface tension of the liquefied molding material may contribute to such shape.

Figure 8:
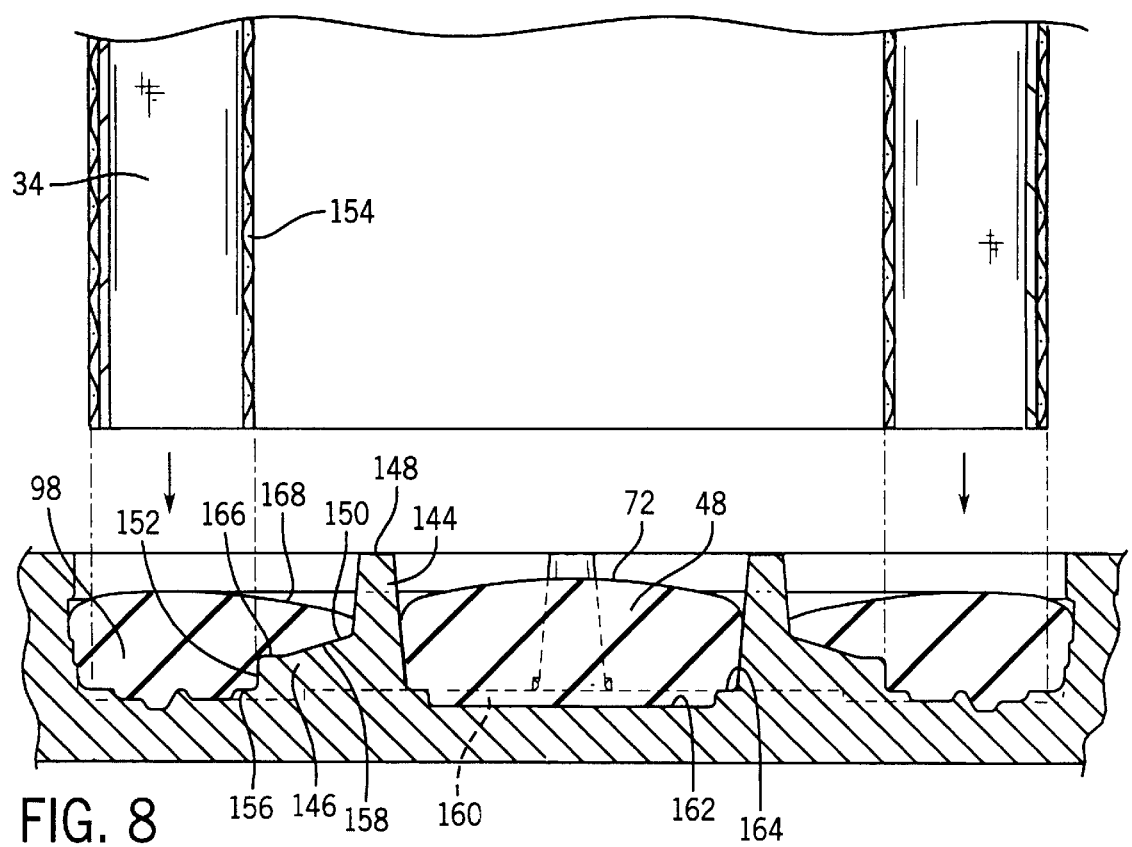
FIG. 8 is a sectional view taken along line 8—8 of FIG. 5.

Ramp 146, FIG. 8, has differing vertical depth portions including a first portion at 150 of a first vertical depth adjacent post 144, and a second portion at 166 of a second vertical depth adjacent outer locator face 152. The vertical depth of portion 150 below the surface of the liquefied molding material is less than the vertical depth portion 166 below the surface of the liquefied molding material such that there is less urethane foam and less expansion thereof above portion 150 than above portion 166, to provide an upwardly facing channel 168 in lower end cap 48 which is tapered and sheds moisture downwardly and radially inwardly from annual filter media 34. The lower end cap has differing axial thicknesses along radial segment 98, FIG. 3, which axial thickness increases as such segment extends radially outwardly toward annular filter media 34. Surface tension of the liquefied molding material is also believed to contribute to the observed curved and tapered surface 168 at radial segments 98, 100, 102, 104 and at trough 80 and at radial segments 110, 112, 114, 116.

It is recognized that various equivalents, alternatives and modifications are possible within the scope of the appended claims. For example, annular includes other functional equivalents, such as oval and other closed loop configurations. Vertical includes other functional equivalents including a range of orientation angles relative thereto which still afford the noted drainage function.

What is claimed is:

1. An inside-out reverse air flow filter element comprising:

annular filter media having a hollow interior and extending axially along a central vertical axis;

an annular upper end cap having a central opening for receiving incoming air flow axially downwardly into said hollow interior;

a closed lower end cap spanning said hollow interior, such that air in said hollow interior flows radially outwardly through said annular filter media;

said lower end cap being a resilient compressible molded member having molded drainage surfaces comprising:
a molded raised central dome shedding moisture radially outwardly and downwardly from said central axis;
a plurality of molded drainage holes spaced radially outwardly of said central axis and below the top of said central dome,
wherein said molded drainage surfaces further comprise a molded annular trough having a first surface sloped upwardly and radially inwardly toward said central dome, and having a second surface sloped upwardly and radially outwardly toward said annular filter media.

2. The invention according to claim 1 wherein said trough is radially spaced between said central dome and said annular filter media.

3. The invention according to claim 2 wherein said drainage holes are in said trough.

4. An inside-out reverse air flow filter element comprising:

annular filter media having a hollow interior and extending axially along a central vertical axis;

an annular upper end cap having a central opening for receiving incoming air flow axially downwardly into said hollow interior;

a closed lower end cap spanning said hollow interior, such that air in said hollow interior flows radially outwardly through said annular filter media;

said lower end cap being a resilient compressible molded member having molded drainage surfaces comprising:
   a molded raised central dome shedding moisture radially outwardly and downwardly from said central axis;
   a plurality of molded drainage holes spaced radially outwardly of said central axis and below the top of said central dome,
   wherein each said drainage hole extends axially through said lower end cap and has axially extending sidewalls of different axial length comprising an inner sidewall having a first axial length and receiving moisture from said central dome, and an outer sidewall having a second axial length and spaced radially outwardly of said inner sidewall by said drainage hole therebetween and spaced radially inwardly of said annular filter media and receiving moisture therefrom, said first axial length being greater than said second axial length.

5. The invention according to claim 4 wherein each of said sidewalls extends from an upper reach downwardly to a lower reach, and wherein the lower reach of said inner sidewall is below the lower reach of said outer sidewall.

6. An inside-out reverse air flow filter element comprising:
   annular filter media having a hollow interior and extending axially along a central vertical axis;
   an annular upper end cap having a central opening for receiving incoming air flow axially downwardly into said hollow interior;
   a closed lower end cap spanning said hollow interior, such that air in said hollow interior flows radially outwardly through said annular filter media;
   said lower end cap being a resilient compressible molded member having molded drainage surfaces comprising:
      a molded raised central dome shedding moisture radially outwardly and downwardly from said central axis;
      a plurality of molded drainage holes spaced radially outwardly of said central axis and below the top of said central dome,
      wherein said lower end cap has a set of a plurality of radial segments, one for each said drainage hole, each said radial segment extending from a respective said drainage hole radially outwardly toward said annular filter media, said lower end cap having top and bottom surfaces along each of said radial segments, wherein said top surface tapers upwardly as it extend radially outwardly from said drainage hole.

7. The invention according to claim 6 wherein said bottom surface tapers downwardly as its extends radially outwardly from said drainage hole.

8. The invention according to claim 6 wherein said lower end cap has a second set of a plurality of radial segments interdigitated with said first mentioned set of radial segments, said first and second sets of radial segments circumscribing said central dome, said lower end cap having top and bottom surfaces along each of said radial segments of said second set, wherein said top surfaces of said second set taper upwardly as they extend radially outwardly.

9. The invention according to claim 8 wherein said bottom surfaces of said second set extend substantially horizontally as they extend radially outwardly.

10. The invention according to claim 8 herein said top surfaces of said radial segments of said second set taper at a smaller angle relative to horizontal than said top surfaces of said radial segments of said first set.

11. An inside-out reverse air flow filter element comprising:
   annular filter media having a hollow interior and extending axially along a central vertical axis;
   an annular upper end cap having a central opening for receiving incoming air flow axially downwardly into said hollow interior;
   a closed lower end cap spanning said hollow interior, such that air in said hollow interior flows radially outwardly through said annular filter media;
   said lower end cap being a resilient compressible molded member having molded drainage surfaces comprising:
      a molded raised central dome shedding moisture radially outwardly and downwardly from said central axis;
      a plurality of molded drainage holes spaced radially outwardly of said central axis and below the top of said central dome,
      wherein said lower end cap has a set of a plurality of radial segments, one for each said drainage hole, each said radial segment extending from a respective said drainage hole radially outwardly toward said annular filter media, said lower end cap having an axial thickness which varies along each of said radial segments.

12. The invention according to claim 11 wherein said axial thickness increase as said radial segment extends radially outwardly.

13. The invention according to claim 11 wherein said lower end cap has a second set of a plurality of radial segments interdigitated with said first mentioned set of radial segments, said first and second sets of radial segments circumscribing said central dome, said second set of radial segments having a different axial thickness than said first set of radial segments.

14. The invention according to claim 13 wherein said lower end cap has an axial thickness which varies along each of said radial segments of said second set, and wherein the variance of axial thickness of said lower end cap along said first set of radial segments is greater than the variance of axial thickness of said lower end cap along said second set of radial segments.

* * * * *